March 28, 1961 V. E. HAAS 2,977,418

COMBINED OSCILLATOR AND HEAD PHONE FOR CODE PRACTICE

Filed March 12, 1958

INVENTOR
Victor E. Haas,
BY Harold C. Horne
ATTORNEY

United States Patent Office 2,977,418

Patented Mar. 28, 1961

2,977,418

COMBINED OSCILLATOR AND HEAD PHONE FOR CODE PRACTICE

Victor E. Haas, 7613 Wisconsin Ave., Bethesda, Md.

Filed Mar. 12, 1958, Ser. No. 720,947

2 Claims. (Cl. 178—115)

This invention relates to a code phone though not necessarily restricted to that particular use and includes a telephone receiver with a miniature oscillator incorporated therein. With the advent of transistors, particularly the smaller units and miniature batteries, it has made it possible to realize my invention of providing an audio frequency amplifier which may be incorporated entirely within the casing of an ordinary headphone without noticeably increasing the weight thereof.

The primary object of this invention is to provide a code practice set in which an audio frequency oscillator is housed entirely within a phone casing with a code practice key connected with the phone conductor cord and contemplates one or more phone receivers connected in parallel or series for code practice or an inter-com system.

Another object of this invention is to provide such a phone set and audio frequency oscillator wherein the diaphragm oscillating circuit provides an essential part of the oscillatory circuit.

Another object is to provide a code phone comprising a headset with a transistor oscillator housed within the headset casing and preferably, also a miniature battery for energizing the oscillatory circuit housed within the casing.

Another object of the invention is to provide such an audio frequency oscillator telephone receiver in which a variable potentiometer is incorporated in the oscillator circuit whereby the tone frequency may be varied and thereby provide a miniature audio frequency calibrating device.

Obviously, other uses may be found for this invention by those experienced in the art as will be apparent from the above objects and explained in the following specifications and drawings wherein specific embodiment is disclosed in detail.

In the drawings:

Figure 1 is a side elevation of a preferred type of telephone headset to which my invention may be applied.

Figure 2 is a face view of the telephone casing shown in Figure 1 with the diaphragm and its retaining cap removed showing an arrangement of elements of a transistor type oscillator housed therein.

Figure 3 is a wiring diagram of the code phone.

Figure 4 is a similar wiring diagram showing a potentiometer in the oscilaltor circuit for varying the tone frequency to provide a miniature audio frequency calibrating device or the like.

Figure 5 is a schematic showing of plurality of such phone sets, at least one of which includes a miniature audio frequency oscillator.

Figures 1, 2, 3, 4, 5:
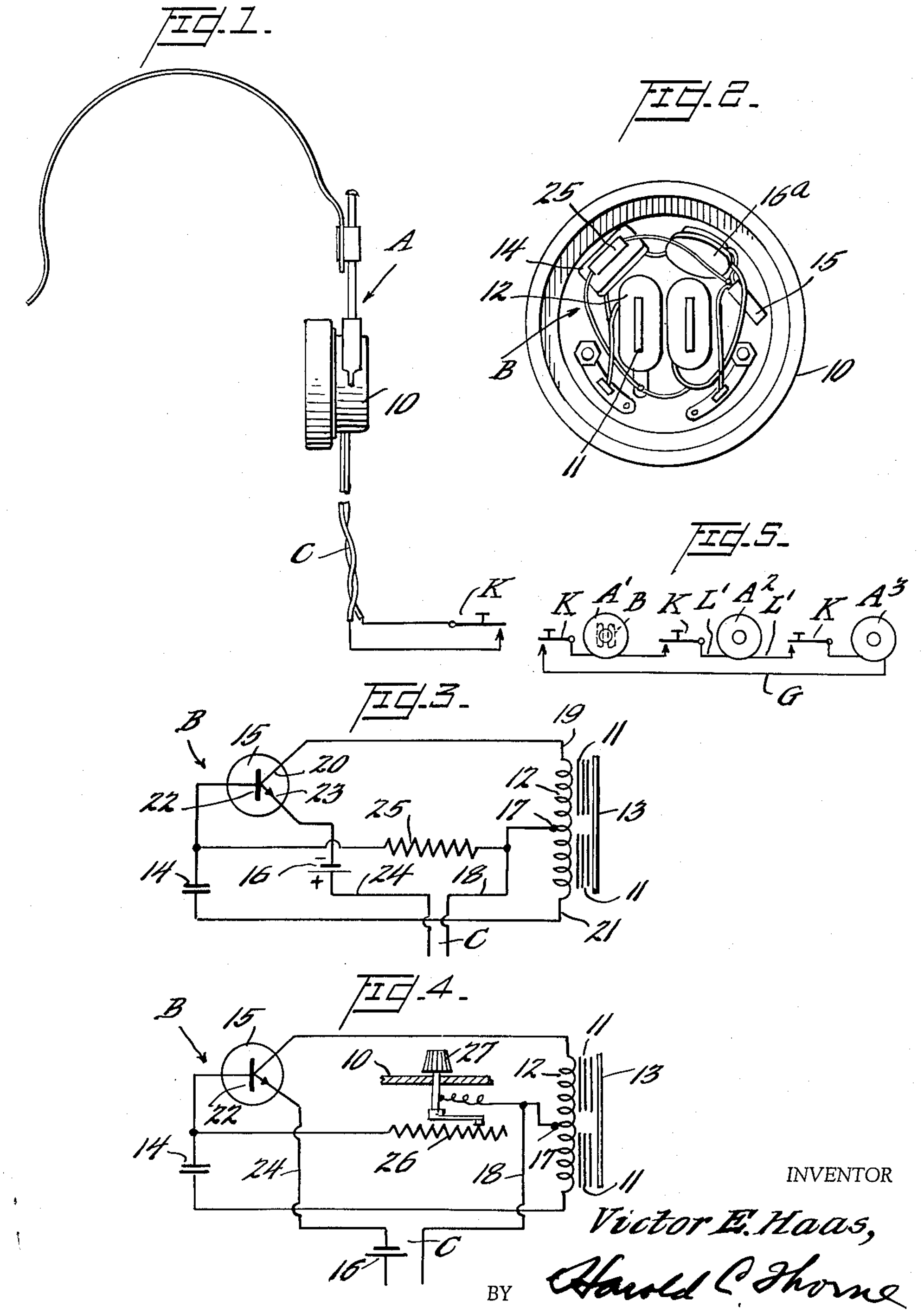

Referring in detail to the drawings, in Figure 1 is shown a conventional type of telephone headset A having a casing 10 incorporating therein an oscillator B as diagrammatically shown in Figures 2, 3, 4 with its conductor cord C connected to a conventional code key K. This telephone receiver includes the usual magnet cores 11 with core winding 12 thereon and a vibrating diaphragm 13.

In accordance with my invention, I incorporate within the phone casing 10 a miniature oscillator B including the core windings 12 as the inductance elements thereof, together with a condenser 14, a transistor 15, a battery 16 and a resistor 25 which may be arranged as shown in Figure 2. I have found that a 1000 to 5000 ohm receiver is practical and the condenser is in the range of .01 to .05 mfd. which will provide a satisfactory audio frequency tone that can be varied as desired as hereinafter set forth. The battery 16 is extremely small; I have found a 1.2 volt mercury cell such as the Sonotone #M–40*a* to be highly satisfactory for replaceable mounting within a plastic case 16*a* inside the phone casing 10. The oscillator circuit may be any conventional circuit arrangement but preferably I employ a feedback oscillator circuit as shown in circuit diagrams Figures 3 and 4.

By modifying the connections of the cord C with the core winding 12, these magnet windings provide the inductive elements of the oscillator circuit and also function to vibrate the diaphragm 13 in the usual manner. In such modification, the oscillator has its mid tap 17, that is the connection between the core windings, connected with one conductor 18 of the conductor cord C. One end 19 of the inductance 12 is connected to the collector element 20 of transistor 15 and the other end 21 of this inductance is connected through condenser 14 with the base 22 of the transistor 15. The emitter element 23 of transistor 15 is connected with the negative pole of battery 16, within phone casing 10 and the positive pole of this battery is connected with the other conductor 24 of conductor cord C. A resistor 25 connected between the transistor base 22 and inductance mid tap 17 completes the oscillator circuit although in some instances I have found that this resiston may be omitted. It will be seen that battery 16 is normally an open circuit except when conductor cord circuit is closed as by means of a switch or code key K connected with the cord conductors 18 and 24.

The arrangement as set forth has been found to operate to emit audio tone frequencies when the code key K is depressed and to energize the oscillating circuit B and thereby vibrate the diaphragm 13. This frequency is dependent of course on the inductance, capacity and resistance constants employed and conveniently may be changed by using smaller or larger values.

This code phone is inexpensive to produce and is highly satisfactory constructed as above described. However, in order to vary the tone frequency to any desired pitch, in place of a fixed resistor 25 a variable potentiometer 26 may be employed, as shown in Figure 4, in either case connected between the base element 22 of transistor 15 and the mid tap 17 of the oscillator inductance 12. For the potentiometer a control knob 27 positioned exterior of casing 10 affords means for adjusting the potentiometer 25 and thus varying the audio frequency of the oscillator B, thus providing a miniature audio frequency calibrating device.

In connection with the phone set and oscillator combination as set forth in detail above, I have disclosed a magnetic type of headphone as the simplest arrangement. However, obviously other types of headphones such as condenser or dynamic types wherein, the oscillator circuit is arranged to incorporate the corresponding elements of the phone set in the oscillatory circuit with the complementary additional elements to provide the complete oscillatory circuit.

In the construction illustrated, I have shown my invention applied to a single headset, however, obviously it is applicable to other types of telephone receivers or to double headsets. As stated, the core windings connections with the phone cord C has been altered to provide the dual functioning core windings, thus altering the circuits of a conventional phone receiver. If desired, the cord C and core windings 12 may include a double pole double throw switch in order to allow normal use of head phone or for use as an oscillating device.

A plurality of code phones A–1, A–2, A–3, as shown in Figure 5 may be closely connected or at separated stations for code practice or as an inter-com system. In the arrangement shown the units are connected in series, a code key K, of the conventional type, being provided adjacent to each unit or station in metallic conductor lines L–1, L–1 etc., between the units A–1, A–2 etc., and a conductor G connecting the remote units which obviously could be a ground return therebetween. In such a system, at least one of the units should contain the oscillator elements B so denoted on unit A–1 in which it is encased. However, it is preferable to have an oscillator unit B in each phone. Of course the units A–1, A–2 etc., may be arranged in a parallel circuit for such multiple operation. It also may be desirable to employ an external battery or power source in order to facilitate a greater number of code phones as suggested in Figure 4 by battery 16 in cord C.

What is claimed is:

1. A code phone comprising the combination with a conventional type head phone having a vibratory diaphragm, a magnet core with its pole pieces in close proximity to the diaphragm and a winding on each of said pole pieces interconnected with each other, all enclosed in a telephone receiver casing, of an electronic audio frequency oscillator housed in said casing, said oscillator comprising a transistor including its base, collector and emitter elements, a capacitor and a tuning resistor, in which the collector is connected with the free end of a winding on one of the magnet core pole pieces, a connection between the free end of the winding on the other magnet core pole piece through said capacitor to the base, a connection between the interconnection of the two windings through said tuning resistor to the base, a source of potential and circuit closing means between said interconnection of the windings and the emitter which when the circuit is closed energizes the oscillator and effects audio frequency vibrations of the diaphragm.

2. An audio frequency generator comprising, vibratory diaphragm, a magnet core with its pole pieces in close proximity to the diaphragm, a winding on each of said pole pieces interconnected with each other, and an electronic audio frequency oscillator comprising a transistor including its base, collector and emitter elements, a capacitor, a tuning resistor, and said interconnected windings on the magnet core pole pieces, in which the collector is connected with the free end of one of said interconnected windings, a connection between the free end of the other winding through said capacitor to the base, a connection from said interconnection of the windings through said resistor to the base, and a source of potential and circuit closing means providing a connection between said interconnection of the windings and the emitter which when the circuit is closed energizes the oscillator and effects audio frequency vibrations of the diaphragm.

References Cited in the file of this patent

UNITED STATES PATENTS

| | | |
|---|---|---|
| 2,492,125 | Bailey et al. | Dec. 20, 1949 |
| 2,613,282 | Scaife | Oct. 7, 1952 |
| 2,780,767 | Janssen | Feb. 5, 1957 |

OTHER REFERENCES

Popular Electronics Magazine, March 1956, page 32, "Code Practice Oscillator," by Louis Garner.

Transistor Circuit Handbook; L. E. Garner, 1956, page 314.

Radio & TV News, April 1953, article by Louis E. Garner, Jr., pages 40, 41 and 99 entitled, "A Transistor Code Practice Oscillator."

Radio & TV News, February 1954, article by Louis E. Garner, Jr., pages 40 and 41, entitled, "A Subminiature Code Practice Oscillator."